(12) United States Patent
Zhan et al.

(10) Patent No.: US 12,196,911 B2
(45) Date of Patent: Jan. 14, 2025

(54) METHOD AND APPARATUS FOR OBTAINING REAL-TIME DOWNHOLE OIL SATURATION

(71) Applicant: CHINA PETROLEUM & CHEMICAL CORPORATION, Beijing (CN)

(72) Inventors: Sheng Zhan, Houston, TX (US); Jeremy Zhang, Houston, TX (US)

(73) Assignee: CHINA PETROLEUM & CHEMICAL CORPORATION, Beijing (CN)

(*) Notice: Subject to any disclaimer, the term of this patent is extended or adjusted under 35 U.S.C. 154(b) by 286 days.

(21) Appl. No.: 17/817,242

(22) Filed: Aug. 3, 2022

(65) Prior Publication Data
US 2022/0413180 A1    Dec. 29, 2022

Related U.S. Application Data

(63) Continuation-in-part of application No. 17/653,561, filed on Mar. 4, 2022, which is a continuation-in-part (Continued)

(51) Int. Cl.
*G01V 5/10*    (2006.01)
*E21B 49/00*    (2006.01)

(52) U.S. Cl.
CPC .............. *G01V 5/105* (2013.01); *E21B 49/00* (2013.01)

(58) Field of Classification Search
CPC ......... G01V 5/105; G01V 5/104; E21B 49/00
See application file for complete search history.

(56) References Cited

U.S. PATENT DOCUMENTS 3,582,655 A * 6/1971 Hoyer .................... G01V 5/102
  330/99
3,777,147 A * 12/1973 Hoyer .................... G01V 5/102
  250/269.7
(Continued)

FOREIGN PATENT DOCUMENTS

| CN | 108643890 A | 10/2018 |
| WO | 2012064797 A2 | 5/2012 |

(Continued)

OTHER PUBLICATIONS

Wores, Birhanu Tsegaye; "Elemental Analysis of Geological, Herbal and Food Samples Using Instrumental Neutron Activation Analysis (INAA)"; Addis Ababa University; Mar. 2015; pp. 1-50.

*Primary Examiner* — David P Porta
*Assistant Examiner* — Gisselle M Gutierrez
(74) *Attorney, Agent, or Firm* — NKL Law; Allen Xue

(57) ABSTRACT

A method for measuring an oil saturation value of a subterrain formation uses a tool having multiple dual-function detectors that detect neutrons and gamma rays. The method includes emitting neutrons into the formation, detecting neutrons and gamma ray signals form the formation using the detectors, determining formation parameters including the formation type and formation porosity, and further determining parameters such as C/O ratios at each of the detectors, a total neutron count rate at each of detectors, a fast neutron count rate at each of detectors, and a thermal neutron count rate at each of the three or more detector, and calculating the oil saturation value using the determined parameters.

14 Claims, 12 Drawing Sheets

200

Related U.S. Application Data of application No. 17/333,834, filed on May 28, 2021, now Pat. No. 11,906,692.

(60) Provisional application No. 63/148,571, filed on Feb. 11, 2021, provisional application No. 63/148,573, filed on Feb. 11, 2021.

(56) References Cited

U.S. PATENT DOCUMENTS

| | | | |
|---|---|---|---|
| 4,122,339 A | 10/1978 | Smith, Jr. et al. | |
| 4,286,150 A * | 8/1981 | Allen | G01V 5/104 |
| | | | 250/269.2 |
| 4,379,228 A * | 4/1983 | Allen | G01V 5/107 |
| | | | 250/269.5 |
| 5,349,184 A | 9/1994 | Wraight | |
| 7,365,307 B2 * | 4/2008 | Stoller | G01V 5/104 |
| | | | 250/269.2 |
| 7,525,100 B2 | 4/2009 | Kraemer et al. | |
| 7,633,058 B2 | 12/2009 | Stoller et al. | |
| 7,791,017 B2 * | 9/2010 | Stephenson | G01V 5/125 |
| | | | 250/269.7 |
| 7,910,894 B2 | 3/2011 | Kraemer et al. | |
| 8,598,510 B2 | 12/2013 | Zhang et al. | |
| 8,849,573 B2 | 9/2014 | Zhang et al. | |
| 9,012,836 B2 | 4/2015 | Wilson et al. | |
| 9,477,006 B2 | 10/2016 | Zhou et al. | |
| 9,835,759 B2 | 12/2017 | Grau | |
| 10,061,056 B2 | 8/2018 | Moake | |
| 10,379,253 B2 | 8/2019 | Zhou et al. | |
| 11,774,630 B2 * | 10/2023 | Inanc | G01V 5/105 |
| | | | 250/264 |
| 2003/0068001 A1 | 4/2003 | Pearcy et al. | |
| 2006/0075223 A1 | 4/2006 | Bade et al. | |
| 2006/0192096 A1 | 8/2006 | Radtke et al. | |
| 2006/0226351 A1 * | 10/2006 | Stoller | G01V 5/104 |
| | | | 250/269.4 |
| 2008/0308720 A1 | 12/2008 | Ferguson | |
| 2009/0045329 A1 | 2/2009 | Stoller | |
| 2011/0112810 A1 | 5/2011 | Scoullar et al. | |
| 2011/0204217 A1 * | 8/2011 | Oraby | G01V 5/104 |
| | | | 250/269.6 |
| 2011/0224906 A1 | 9/2011 | Zhang et al. | |
| 2011/0253448 A1 | 10/2011 | Trinh et al. | |
| 2011/0284731 A1 * | 11/2011 | Roscoe | G01V 5/105 |
| | | | 378/54 |
| 2012/0126105 A1 | 5/2012 | Evans et al. | |
| 2012/0197529 A1 | 8/2012 | Stephenson et al. | |
| 2013/0206972 A1 | 8/2013 | Zhou et al. | |
| 2014/0001350 A1 | 1/2014 | Beekman et al. | |
| 2016/0024909 A1 | 1/2016 | Han et al. | |
| 2016/0154141 A1 | 6/2016 | Moake | |
| 2017/0176635 A1 | 6/2017 | Kramer | |
| 2017/0211382 A1 | 7/2017 | Jacobson et al. | |
| 2017/0315260 A1 | 11/2017 | Stoller | |
| 2017/0362931 A1 | 12/2017 | Homan et al. | |
| 2018/0164469 A1 | 6/2018 | Kuespert | |
| 2018/0172876 A1 | 6/2018 | Inanc et al. | |
| 2018/0231683 A1 | 8/2018 | Teague et al. | |
| 2019/0025454 A1 | 1/2019 | Galford | |
| 2019/0094410 A1 * | 3/2019 | Mendez | G01V 5/12 |
| 2022/0252755 A1 | 8/2022 | Zhan et al. | |
| 2022/0308253 A1 | 9/2022 | Zhang et al. | |
| 2023/0123713 A1 * | 4/2023 | Zhan | G01V 5/045 |
| | | | 250/269.6 |

FOREIGN PATENT DOCUMENTS

| | | |
|---|---|---|
| WO | 2019060320 A2 | 3/2019 |
| WO | 2020219148 A1 | 10/2020 |

* cited by examiner

300

A-A      B-B      C-C      D-D

A-A      B-B      C-C      D-D

A-A      B-B      C-C      D-D

400

A-A  B-B  C-C  D-D

A-A  B-B  C-C  D-D

600

METHOD AND APPARATUS FOR OBTAINING REAL-TIME DOWNHOLE OIL SATURATION

RELATED APPLICATIONS

This application is a continuation-in-part of U.S. patent application Ser. No. 17/653,561, filed on Mar. 4, 2022, which is a continuation-in-part of U.S. patent application Ser. No. 17/333,834, filed on May 28, 2021, which claims the benefit of priority under 35 U.S.C. § 119 to U.S. provisional application Ser. No. 63/148,571, filed on Feb. 11, 2021, and U.S. provisional application Ser. No. 63/148,573, filed on Feb. 11, 2021. Each of these applications is hereby incorporated by reference in its entirety.

BACKGROUND

1. Field of Technology

This disclosure provides methods and systems for nuclear well logging and formation evaluation, in particularly methods and systems for nuclear logging and data analysis to obtain real-time formation oil saturation using pulsed neutron logging tool having multiple dual-function detectors.

2. Description of Related Art

In oil and gas exploration, porosity, mineralogy, density, and gas/oil saturation are important formation parameters for evaluating the total oil/gas reserves in a field. Various wireline and LWD (Logging-While-Drilling) logging tools have been developed for the measurement of downhole formation parameters.

Neutron porosity logging tools investigate the formation porosity by measuring the ratio of neutron count rates from a near detector to that of a far detector after fast neutrons from an isotope neutron source (e.g., an Am—Be source) have been slowed down by tool surroundings (e.g., wellbore fluid and formation) and scattered back to the detectors. The ratio is then translated to porosity according to the specific formation mineralogy (e.g., sandstone, limestone, or dolomite). Using the ratio of count rates from two detectors reduces the effect of variations in the near-wellbore environment (wellbore fluid, borehole size, etc.) on the porosity measurement.

Formation mineralogy can be obtained by a pulsed neutron tool, employing a pulsed neutron source (e.g., a D-T neutron generator) and one, two, or three detectors that detect neutrons or neutron-induced gamma rays. The energy spectrum of neutron-induced gamma rays from each element is unique. By measuring the energy spectrum of gamma rays from fast neutron inelastic scattering and/or from thermal neutron capture reactions, one may identify elements and obtain the relative percentage of gamma rays from each of those elements in the formation, i.e., the elemental yields. The inelastic spectrum is the basis for detecting Mg, Fe, S, C, Al, Si, Ca, and O elements. The capture spectrum provides information on other elements, such as Mg, S, Ti, Al, K, Ca, Si, Gd, Fe, Cl, H elements.

Since the elemental yield logs only provide the relative concentration of elements, they are normally presented as ratios, such as C/O, Cl/H, Si/(Si+Ca), H/(Si+Ca), and Fe/(Si+Ca). These ratios are indicators of oil, salinity, mineralogy, porosity, and clay, respectively. The elemental yield logs, together with cross sections of neutron inelastic scattering and neutron capture reactions of those elements, can also be used to obtain element concentrations in the formation.

Further, by measuring thermal neutron time-decay curve or capture gamma ray time-decay curve after a neutron pulse or several neutron pulses, one may obtain the macro thermal neutron absorption cross section (sigma) of the formation, which can be utilized to estimate oil/gas saturation when the formation salinity is high.

When the formation salinity is low, C/O ratio is the primary method to obtain the formation oil saturation. The C/O ratio can be either the ratio of the elemental yields of C to O, or the ratio of total count rates of inelastic gamma rays from C to O, or the ratio of inelastic gamma rays from in two energy windows selected for C to O.

To accurately estimate oil saturation, one would need to know formation type (e.g., limestone, sandstone, or dolomite) and formation porosity and wellbore environments (e.g., wellbore size, borehole fluid). The oil saturation can be a function of C/O ratio and porosity for a specific formation type and wellbore environment. FIGS. 1A and 1B are exemplary charts showing the how oil saturation depends on the C/O ratio and the formation porosity in limestone for the near and far detectors. FIGS. 1C and 1D are exemplary charts showing the how oil saturation depends on the C/O ratio and the formation porosity in sandstone for the near and far detectors. When the porosity and oil saturation are the same, the C/O ratio is higher for limestone than for sandstone, the reason is that limestone ($CaCO_3$) contains carbon element whereas sandstone ($SiO_2$) does not.

One way to obtain the oil saturation is to run a series of simulations using a calibrated model and obtain the C/O ratios for the near and far detectors at varied formation porosities for a specific formation type in a specific wellbore condition, e.g., with known oil saturation. Then an algorithm can be developed to relate the C/O ratios and the formation porosity to the oil saturation. In the field application, when C/O ratios are obtained and formation porosity is identified, oil saturation can be obtained using the algorithm.

In most of these applications, neutrons and gamma rays are detected by their respectively detectors/sensors. For example, He-3 gaseous detectors are used to detect thermal neutrons. He-3 isotope has high thermal neutron absorption cross sections. After fast neutrons emitted from a neutron source are slowed down by the formation and scattered back to the detectors, neutrons are absorbed, which produces other detectable ions, such as protons (p) and trilliums (T), which in turn ionize the gas. Ions and electrons are multiplied and drifted in an electric field to form electric signals. A variety of scintillation detectors, e.g., NaI, CsI, BGO, GSO, LaBr3, YAP scintillators and photomultiplier tubes (PMTs), are employed to detect gamma rays. These scintillators convert the deposited energy of gamma rays into scintillation lights. The PMT converts the scintillation lights into electrons and amplifies them to form electronic signals.

Existing nuclear logging tools usually employ single-function detectors that detect either neutrons or gamma rays. For example, to obtain accurate oil saturation information, one needs to know mineralogy, such as sandstone ($SiO_2$), limestone ($CaCO_3$), dolomite ($CaMg(CO_3)_2$), formation porosity, as well as the C/O ratio. Conventionally, since porosity, mineralogy, and C/O logs are obtained by at least one neutron porosity tool and one pulsed neutron tool separately, oil saturation can only be estimated after all the log data are obtained so that real-time oil saturation may not be possible.

The need exists to reduce the numbers of logging tools and logging operations yet still obtain various formation parameters for drilling operations. For example, there is a need to measure formation type, porosity, and C/O ratios simultaneously to accurately estimate the formation oil saturation while drilling. The present disclosure provides new logging tools combining neutron sources and dual-function detectors, which enables faster and real-time assessment of formation oil saturation and other formation parameters by measuring formation mineralogy, porosity and C/O ratios and determining the formation type and oil saturation simultaneously.

SUMMARY

This summary is provided to introduce a selection of concepts in a simplified form that are further described below in the detailed description. It is not intended to identify key features or essential features of the claimed subject matter, nor is it intended to be used as an aid in determining the scope of the claimed subject matter.

According to one of the embodiments in this disclosure, a method for measuring one or more parameters of a subterranean formation includes the steps of: deploying the nuclear logging tool into the subterranean formation, the nuclear logging tool having one or more neutron source and three or more detectors configured to simultaneously detect neutrons and gamma rays; causing the one or more neutron sources to emit neutrons into the subterranean formation; receiving neutrons and gamma rays from the subterranean formation at the three or more detectors to electric signals; separating electric signals from neutrons and gamma rays for each of the three or more detectors; obtaining energy spectrum form inelastic gamma rays and energy spectrum from capture gamma rays; obtaining single element gamma ray energy spectrum for each of a plurality of elements; calculating an elemental yield of each element to obtain concentration of each element in the formation; and determining the formation type based on the element concentrations in the formation.

In some embodiments, the plurality of elements are selected from Mg, Fe, S, C, Al, Si, Ca, O, Ti, K, Gd, Cl, and H. Further, the fast neutron count rates and the thermal neutron count rates at the three detectors, the inelastic spectrum, and the capture spectrum obtained are used in calculating element concentrations.

The disclosure further provides a method for obtaining formation porosity of in a subterranean formation which has steps of: after obtaining the formation type, obtaining count rates for total neutrons, fast neutrons, thermal neutrons for each of the three or more detectors; calculating a ratio of neutron count rates for every two detectors amongst the three or more detectors to obtain a plurality of neutron count rate ratios; and obtaining a formation porosity based on the plurality of neutron count rate ratios and the formation type.

In still further embodiments, after the formation type and the formation porosity have been determined, the oil saturation of the subterranean formation can be obtained using a method that includes the steps of: calculating oil saturation using the formation type, the formation porosity, and a parameter selected from C/O ratios at each of the three or more detectors, a total neutron count rate at each of the three or more detectors, and a thermal neutron count rate at each of the three or more detector.

In certain embodiment, the calculating step further includes calculating a plurality of apparent oil saturation values using the formation type, the formation porosity, and each of the C/O ratio at each of the three or more detectors; and calculating a corrected oil saturation using the plurality of apparent oil saturation values.

BRIEF DESCRIPTION OF THE DRAWINGS

The teachings of the present invention can be readily understood by considering the following detailed description in conjunction with the accompanying drawings.

Figure 1A:
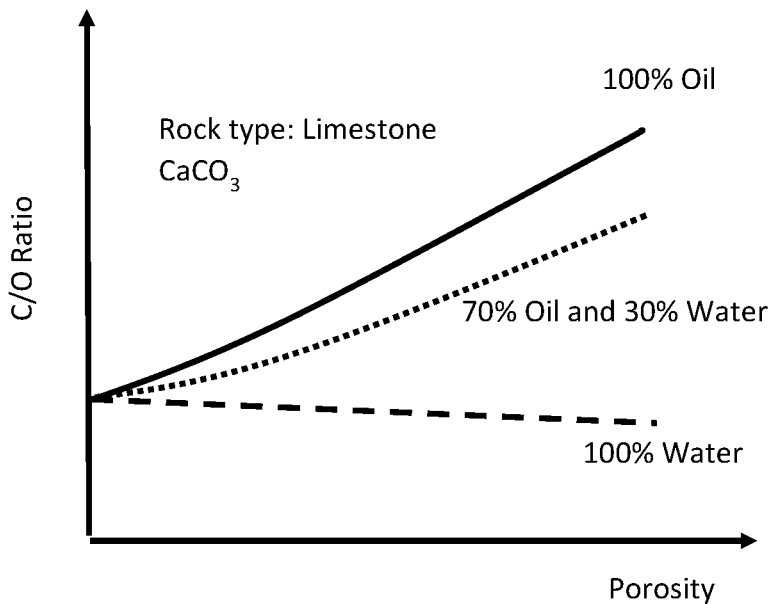
FIG. 1A, FIG. 1B, FIG. 1C, and FIG. 1D illustrate that formation oil saturation is dependent on formation type, porosity and C/O ratios for the near and far detectors for a specific wellbore environment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. References are made in detail to embodiments of the present disclosure, examples of which are illustrated in the accompanying drawings. Similar or like reference numbers may be used in the drawings and may indicate similar or like elements.

The features described herein may be embodied in different forms and are not to be construed as being limited to the embodiments described herein. Rather, the embodiments described herein and depicted in the drawings have been provided so that this disclosure will be thorough and complete and will convey the full scope of the disclosure to one of ordinary skill in the art, who may readily recognize from the following description that alternative embodiments exist without departing from the general principles of the disclosure.

Therefore, the scope of the disclosure is defined not by the detailed description, but by the claims and their equivalents, and all variations within the scope of the claims and their equivalents are to be construed as being included in the disclosure.

In this disclosure, unless otherwise noted, a detector refers to a dual-function detector that can detect both neutrons and gamma rays. Such a detector employs scintillation crystals such as $Cs_2LiYCl_6$ (CLYC) or $Cs_2LiLaBr_6$ (CLLB) and associated electronics, e.g., PMT. The detectors may be actively cooled or not actively cooled when deployed downhole. For example, a detector using CLLB and high-temperature PMT can be used at a high temperature without additional cooling.

Figure 1B:
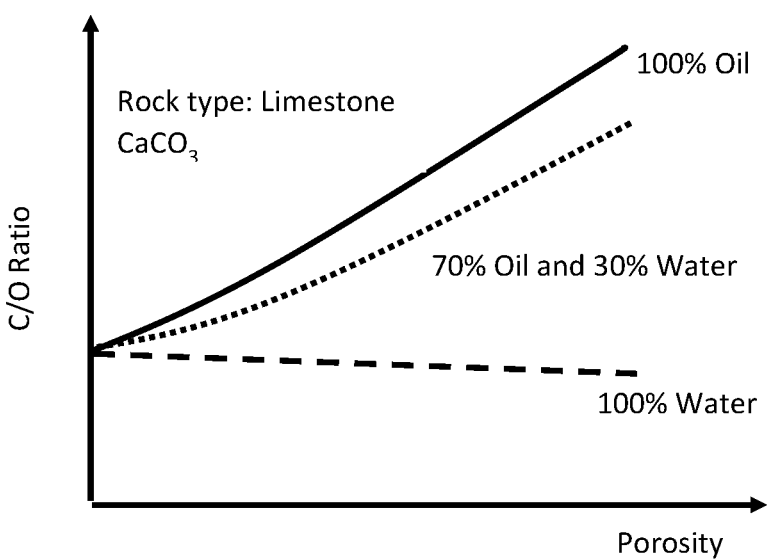
Figure 1C:
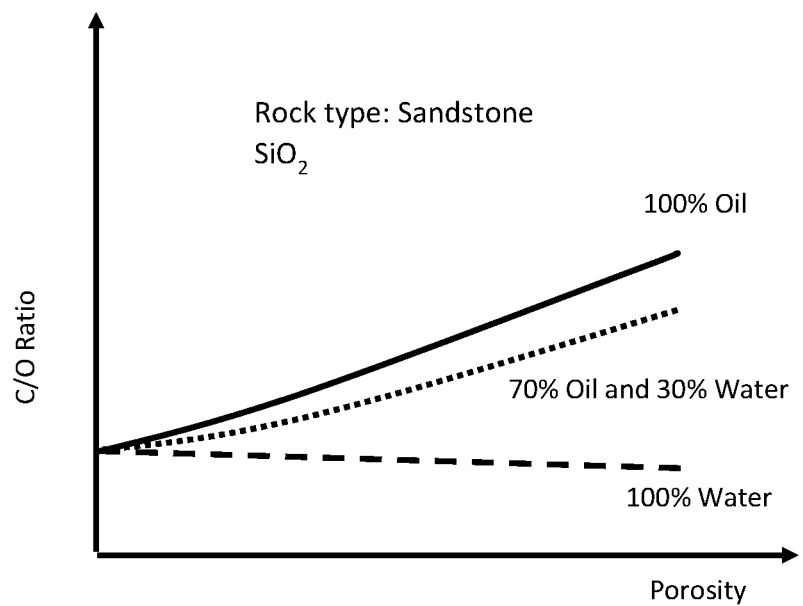
Figure 1D:
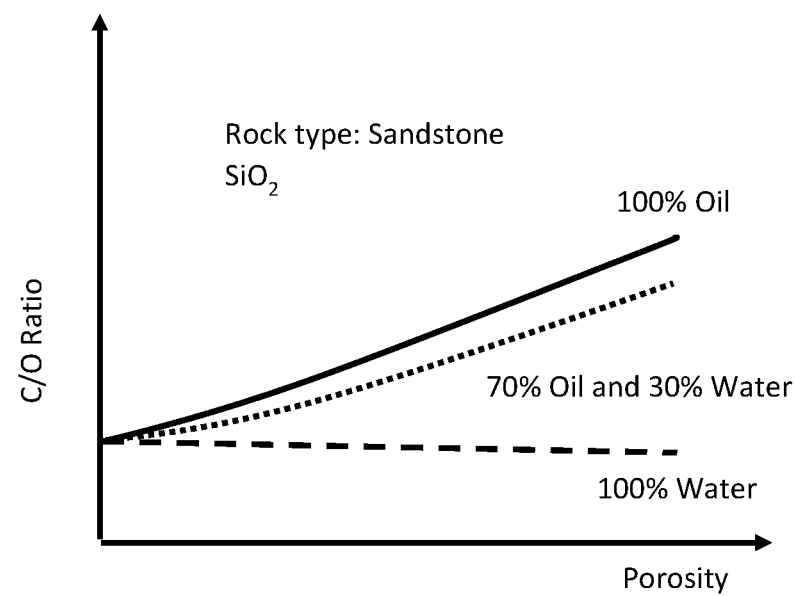

FIG. 1A, FIG. 1B, FIG. 1C, and FIG. 1D illustrate how formation oil saturation correlates to formation type, porosity, and C/O ratios for the near and far detectors for a specific wellbore environment. FIGS. 1A and 1B are exemplary charts showing the correlations between the C/O ratio and the formation porosity in limestone for the near detector and far detector, respectively. FIGS. 1C and 1D are exemplary charts showing the correlations between the C/O ratio and the formation porosity in sandstone for the near detector and far detector, respectively. At the same porosity and oil saturation, the C/O ratio is higher for limestone than for sandstone, probably because limestone ($CaCO_3$) contains carbon element while sandstone ($SiO_2$) does not. Moreover, the C/O ratios are different for the near and far detectors. The reason is that the near detector, which is closer to the neutron source, is affected by the wellbore fluid than the far detector to a greater extent. Therefore, by measuring C/O ratios using multiple detectors and developing a correction algorithm for the wellbore fluid, one may reduce the effect of wellbore environments (e.g., wellbore fluid) on the measured formation oil saturation.

To obtain the oil saturation, a series of simulations can also be run using a calibrated model to obtain the C/O ratios for the near and far detectors at varied formation porosities for a specific formation type in a specific wellbore condition. The calibrated model is a model that has been calibrated (i.e., adjusted) according to experimental data. A calibrated model is to a large extent cured to systematic errors but still has statistical errors. Then algorithms can be developed to correlate the C/O ratios and the formation porosity to the oil saturation for typical formation types and a specific wellbore environment (e.g., wellbore size, borehole fluid etc.). The algorithm can be implemented into the tool's firmware or software. In the field application, as soon as formation type is determined, formation porosity and C/O ratios are obtained, oil saturation can be obtained using the algorithm.

Figure 2A:
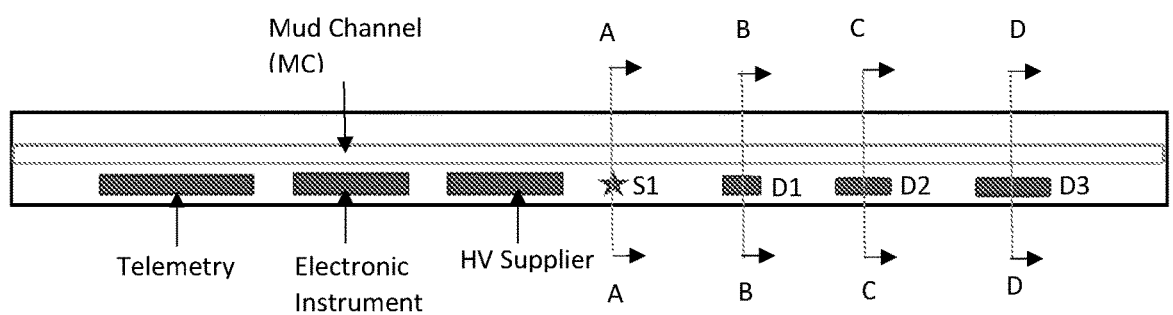
FIG. 2A, FIG. 2B, FIG. 2C, and FIG. 2D illustrate four exemplary configurations of a nuclear logging tool having one neutron source (S1) and three detectors (D1, D2, and D3) disposed along the longitudinal direction of the housing of the tool.

FIGS. 2A to 2D are schematic illustrations (not to scale) of four exemplary configurations of a cylindrical nuclear logging tool 200 having a neutron source (S1) and three dual-function detectors (D1, D2, D3) disposed along the housing of the logging tool suitable for logging-while-drilling (LWD) operations. A mud channel (MC) is disposed along the axis of the logging tool while the detectors are eccentrically disposed along the longitudinal direction of the tool. FIG. 2A also shows a high voltage power supply (HV), an electronic instrument, e.g., a controller, for sending instructions, receiving and processing data from the neutron source and the detectors, as well as a telemetry for transmitting data between the logging tool and surface. The high voltage power supply provides power to detectors (D1, D2, D3) and to the pulsed neutron source (S1). The power supply, the electronic instrument, and telemetry are required but not shown in FIGS. 2B-2D for simplicity.

As shown in the figures, D1 is the near detector that has the shortest distance in longitudinal direction to the neutron source, D3 is the far detector having the longest longitudinal distance to the neutron source, and D2 is the middle detector that has a longitudinal distance that is in the middle.

Figure 2B:
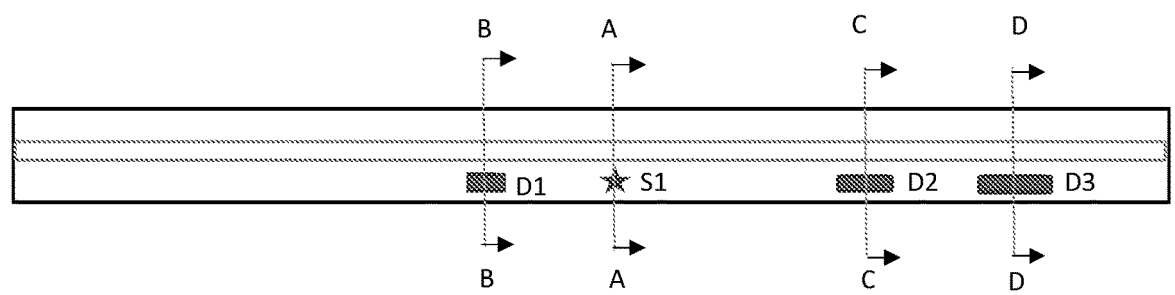
Figure 2C:
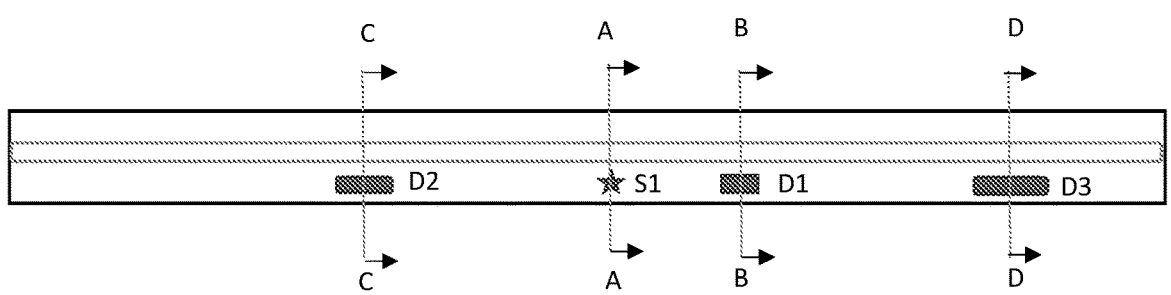
Figure 2D:
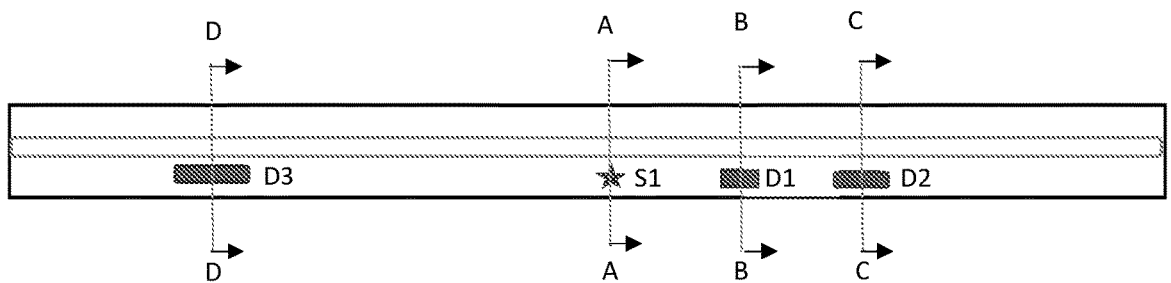

In FIG. 2A, all three detectors reside on one side of the neutron source along the logging tool 200. The one side can be either the proximal side or the distal side of the neutron source. The proximal side is the side of the nuclear logging tool 200 that is closer to the surface when it is deployed downhole while the distal side is farther away from the surface. The high voltage power supply provides power to detectors (D1, D2, D3) and to the pulsed neutron source (S1). The signals from detectors are processed by the electronic instruments and measurements/data are collected and transmitted by telemetry. In FIGS. 2B, 2C, and 2D, both the distal side and the proximal side of the neutron source has at least one detector disposed thereto.

In wireline logging, the tool can be installed in a sonde, which does not contain a mud channel. Detectors can be installed either along or off the axis of the tool body. Power and control signals can also be provided to the logging tool from the surface while data from the logging tool can be transmitted to the surface via the wireline cable.

The neutron source S1 in each logging tool depicted in FIGS. 2A to 2D is a pulsed neutron generator. However, an isotope neutron source can be used as well. The pulsed neutron source may be a Deuterium-Tritium (D-T) pulsed neutron generator, which can be operated in a variety of pulse schematics (e.g., frequency, duty time) in a pulse mode. For example, the frequency of neutron pulses may be about 10 kHz (the period is 100 μs) and the neutron duty time may be about 20 μs. Depending on the methods and measurements, the D-T neutron generator may also be operated in a continuous mode. In that case, the neutron generator is activated frequent enough so that neutrons are emitted continuously. Neutrons from a D-T neutron generator has an initial energy of about 14.1 MeV.

An isotope neutron source, such as Am—Be, Pu—Be, Cf-252, may also be used in the place of the pulsed neutron source, depending on the target formation parameters and measurement methods. Neutrons from these isotope neutron sources have different energy spectra. For an example, the energy of neutrons emitted from an Am—Be source is from 0 MeV to about 10 MeV with an average energy of about 4.2 MeV. However, due to lower neutron energy, gamma ray signals generated by fast inelastic scattering from carbon and oxygen using an isotope neutron source are much lower than those triggered by a D-T neutron generator.

The neutron source S1 and detectors D1, D2, and D3 as depicted in FIGS. 1A-1D only show their relative positions along the longitudinal direction of the housing of the tool 200 but not their positions in the radial direction in a cross-section of the tool housing.

Figure 3A:
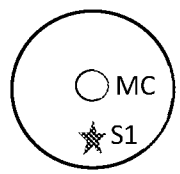
FIG. 3A, FIG. 3B, and FIG. 3C show cross-sectional views of exemplary nuclear logging tools having S1, D1, D2, and D3.
Figure 3A:
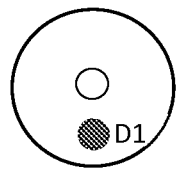
Figure 3A:
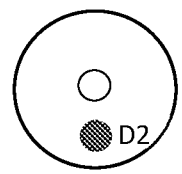
Figure 3A:
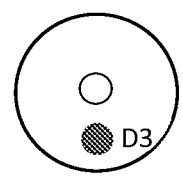
Figure 3B:
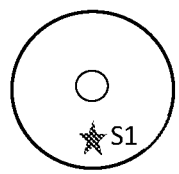
Figure 3B:
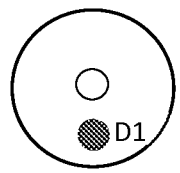
Figure 3B:
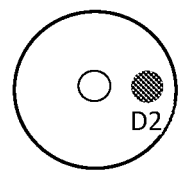
Figure 3B:
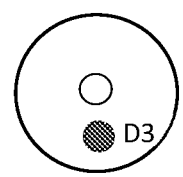
Figure 3C:
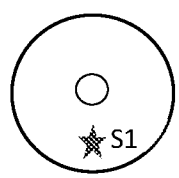
Figure 3C:
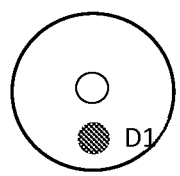
Figure 3C:
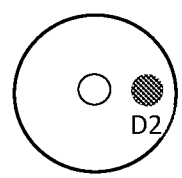
Figure 3C:
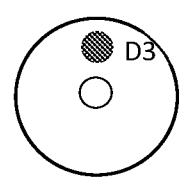

In certain embodiments, S1, D1, D2, and D3 can be disposed at the same radial or different radial directions, i.e., having the same or different toolface angles when deployed in the formation. FIGS. 3A, 3B, and 3C show exemplary cross-sectional views in the directions of A-A, B-B, C-C, and D-D as shown in FIGS. 2A to 2D. S1, D1, D2, and D3 in FIG. 3A are disposed at same toolface angle. In FIG. 3B, however, S1, D1, and D3 have the same toolface angle while D2 is at a different toolface angle. In FIG. 3C, S1 and D1 have the same toolface angle while each of D2 and D3 has a different toolface angle.

Figure 4A:
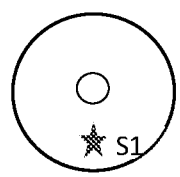
FIG. 4A and FIG. 4B show cross-sectional views of exemplary nuclear logging tools having four (D1, D2, D31, and D32) and six detectors (D1, D21, D22, D31, D32, and D33), respectively.
Figure 4A:
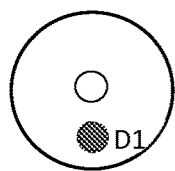
Figure 4A:
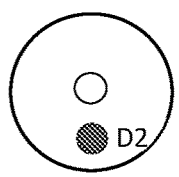
Figure 4A:
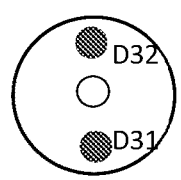
Figure 4B:
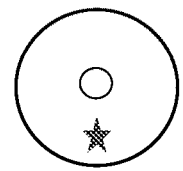
Figure 4B:
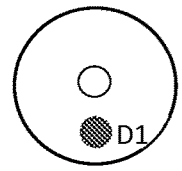
Figure 4B:
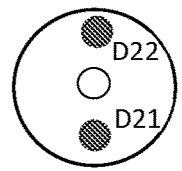
Figure 4B:
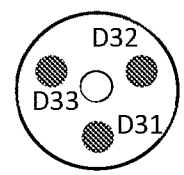

Other embodiments of the logging tool may have more than three detectors. For example, FIG. 4A depicts a variation of the logging tool in FIG. 2A that has four detectors—D1, D2, D31, and D32. D31 and D32 have approximately the same distance from S1 but are disposed at two different toolface angles. Likewise, FIG. 4B depicts another variation of tool in FIG. 2A, which has six detectors—D1, D21, D22, D31, D32, and D33. In this embodiment, D21 and D22 are disposed opposite to each other on the cross-sectional area of the logging tool, i.e., the toolface angle of D21 and D22 is 0° and 180°, respectively. D31, D32, and D33 are disposed 120° apart on the cross-sectional area of the logging tool, i.e., a difference in the toolface angles of any two among D31, D32, and D33 is 120°. Having different toolface angles allows detectors to preferentially receive neutrons and gamma-rays at certain incident angles from the formation. It also increases the detection efficiency of neutrons and gamma rays by increasing the total count rate of all the detectors.

Further, in FIG. 4A, D31 and D32 have substantially the same distance from S1. In FIG. 4B, middle detectors D21 and D22 have substantially the same distance from S1 while far detectors D31, D32, and D33 have substantially the same distance from S1.

"Substantially the same distance" means the distances from S1 to the center of scintillators of the detectors (e.g., D31 and D32) is about the same. For example, the difference is less than ½" or ¼". By this arrangement, the middle detectors as a whole and far detectors as a whole have higher count rates than when only one middle detector or only one far detector is used. Accordingly, the neutron generator S1 can be of a less powerful source, which may not be subject to stringent regulations as more powerful neutron sources are subject to. In addition, the count rate of individual detectors can separately be recorded and processed. The differences of various detectors in distance and in toolface angles can be used to obtain formation information in specific azimuthal directions.

In some embodiments, the logging tool 200 have multiple shields that can absorb neutrons and gamma-rays (not shown). The shields can be placed in the logging tool between the neutron source and the detectors so that the detectors receive neutrons and gamma-rays coming from the formation rather than traveling through the logging tool itself. Alternatively, the detectors can also be partially shielded by the shield material that absorb neutrons and gamma rays from certain directions.

The shield is made of or contains one or more materials that can effectively attenuate both thermal neutrons and gamma rays. The shield material can contain materials chosen from heavy elements having high thermal neutron absorption cross sections, including metals such as gadolinium (Gd), samarium (Sm), metal oxides such as $Gd_2O_3$, $Sm_2O_3$, $B_2O_3$, alloys containing Gd or Sm with other heavy metals Fe, Pb, or W, or materials containing boron, such as tungsten borides (WB, $WB_2$, etc.).

The shield may be a stand-alone metal piece inserted in the logging tool, or an integral part of the detector casing. For example, the portion of the detector casing facing inward to the logging tool can be made of the shield material while the portion facing the formation is made of a material that is transparent to neutrons and gamma rays, forming a window that neutrons and gamma rays can travel through. As such, neutrons and gamma-rays from certain incident angles may be absorbed by the shield material while those travel through the window are received by the detector. Therefore, the detector can be more sensitive to certain incident angles by adjusting the size and orientation of the window in the detector casing. During operation, data collected by various detectors may produce direction-specific formation properties, which can be used to guide directional drilling.

Figure 5A:
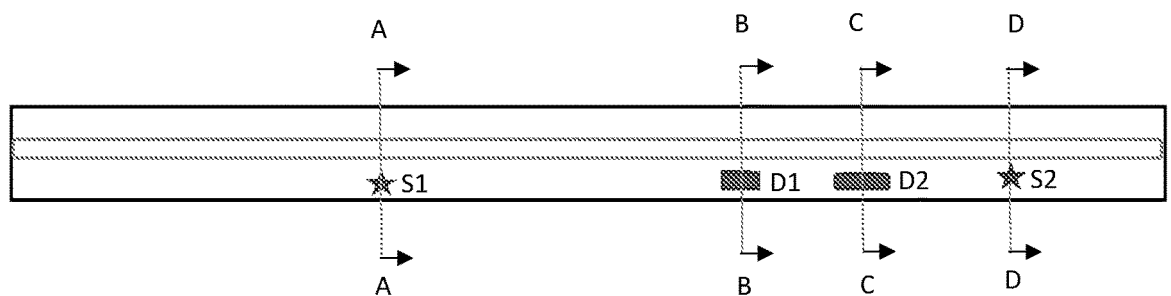
FIG. 5A is an embodiment of the nuclear logging tool having two neutron sources (S1, S2) and two detectors (D1, D2)

The nuclear logging tool may have more than one neutron sources. FIG. 5A shows a further embodiment of the logging tool having two neutron sources (S1 and S2), one at the proximal end and the other at the distal end while two detectors (D1 and D2) are arranged between S1 and S2. Alternatively, S1 and S2 can be arranged in tandem and disposed near one end of the logging tool while D1 and D2 arranged in tandem near the other end, as the engineering considerations require. In both embodiments, the distance between S1 and D1 is $d_1$, the distance between S1 and D2 is $d_2$, the distance between S2 and D2 is $d_3$, while the distance between S2 to D1 is $d_4$. When S1 and S2 are both pulsed neutron generators, they can be alternately turned ON or OFF, thereby inducing neutrons and gamma-rays from the formation alternately, which are received by D1 and D2. Since there are four different source-to-detector distances ($d_1$ to $d_4$), the data generated in D1 and D2 may be better compensated than tools with only two or three source-to-detector distances for near wellbore effects, such as borehole size, tool standoff, mud weight and/or salinity, casing size, cement thickness, etc. As a result, the obtained formation parameters could be more accurate.

Figure 5B:
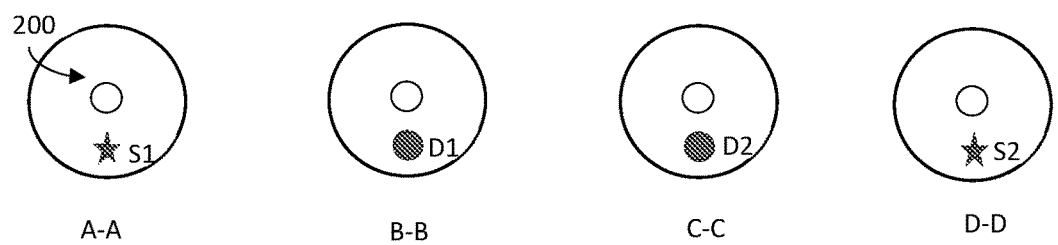
FIG. 5B and FIG. 5C provide cross-sectional views of exemplary configurations of this embodiment.
Figure 5C:
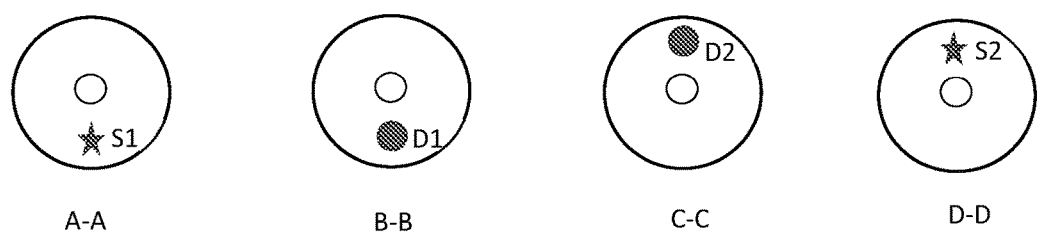

FIG. 5B and FIG. 5C illustrate two exemplary embodiments of the logging tool, where the two sources and two detectors can be arranged at same toolface angle or at different toolface angles. When, as in FIG. 5B, the sources and detectors have the same toolface angle, the measurement covers the same sector in the formation at any given time. When, as in FIG. 5A, the sources and detectors may have different toolface angles, the data generated in D1 and D2 reflect different sectors of the formation, which can reveal differences amongst various formation sectors at any given time by comparing the measurements from D1 and D2.

Figure 6A:
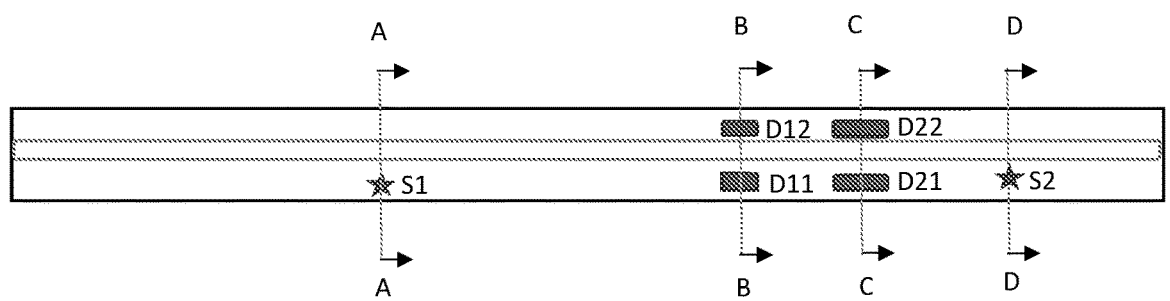
FIG. 6A is a further exemplary embodiment of the nuclear logging tool having two neutron sources (S1, S2) and four detectors (D11, D12, D21, D22)
Figure 6B:
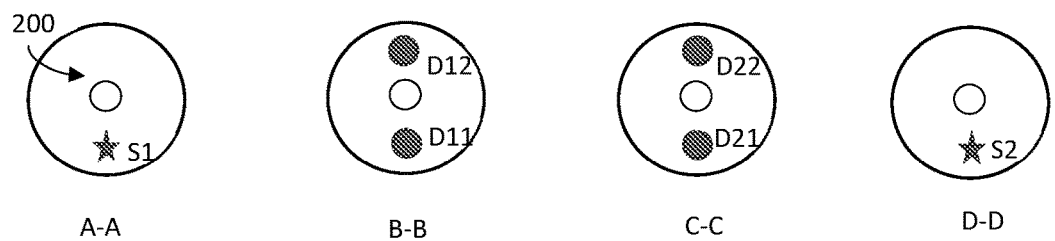
FIG. 6B provides cross-sectional views of this embodiment.

FIGS. 6A and 6B illustrate a logging tool that has four detectors (D11, D12, D21, D22) and two neutron sources (S1 and S2). Note that the pair of detectors D11 and D12 (as well as D21 and D22) are disposed at substantially the same distance from S1 or S2. As indicated before, having more than one detector at a certain distance increase the count rate at that distance so that a less powerful neutron source may be viable. The count rate of one far detector may be too low to provide reliable measurement data. By using two or more far detectors, the count rate can be significantly increased so that reliable measurement results can be obtained by processing data from the multiple far detectors as a whole.

In some embodiments, S1 and S2 can be turned ON or OFF simultaneously. Doing so increases the count rate of D1 and D2, thereby reducing the statistical measurement uncertainty.

In still another embodiment, S1 and S2 are both isotope neutron sources. Compared with pulsed neutron sources, isotope neutron sources do not need power supply so that the logging tool can be more compact. Moreover, the isotope neutron source has a longer lifetime and is more reliable. For example, the half-life of an isotope Am—Be neutron source has a half-life of 432 years, much longer than the average tube lifetime of a neutron generator of 500 hours to 4000 hours.

In yet another embodiment, S1 and S2 can be two different types of neutron sources. For example, S1 can be a D-T neutron generator while S2 can be an Am—Be neutron source. In the field, the D-T neutron generator can be turned off, leaving the Am—Be neutron source working by itself to perform the neutron porosity log. Alternatively, the Am—Be neutron source can be taken out from the logging tool so that the D-T neutron generator alone emits neutron pulses into the surrounding formation. In this case, one may obtain the neutron porosity log as well as other measurements (density, oil and gas saturation, etc.) using the D-T neutron generator.

The porosity logs obtained using the Am—Be source and the D-T source differ slightly. By comparing these porosity logs of the same well obtained using two different neutron sources, one may obtain the correlation between these two logs. As historical porosity logs were mainly obtained using isotope neutron sources, such correlations may help updating the historical porosity logs so that they become comparable with new logs obtained using pulsed neutron sources. Likewise, the new pulsed neutron porosity logs can be converted to match historical porosity logs to continuously use the reservoir models already built using historical logs in production predictions.

Figure 7:
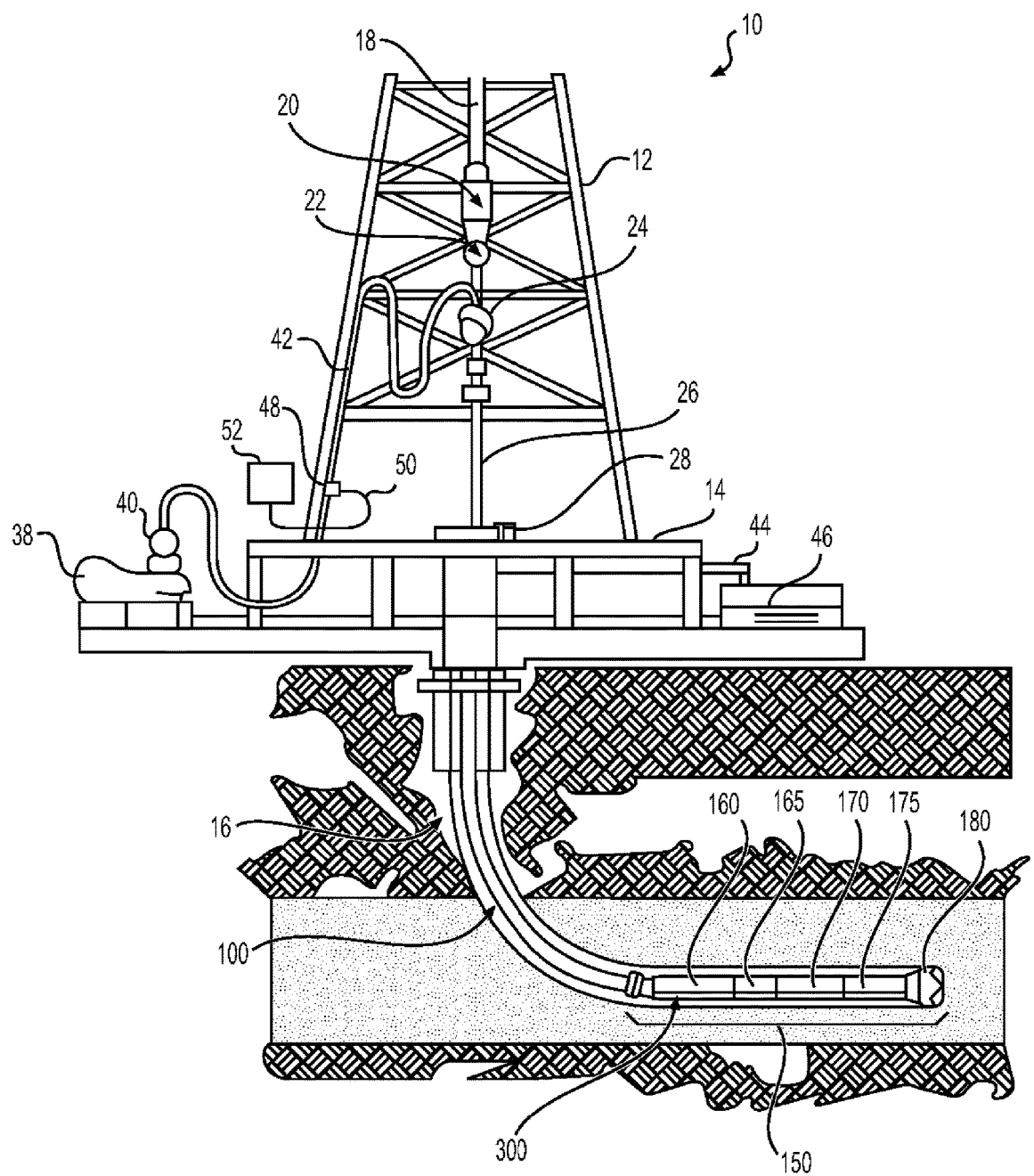
FIG. 7 is a block diagram of an exemplary drilling system that implements an embodiment of the current disclosure.

The logging tool 200 can be a part of a wireline logging tool or be included in a downhole assembly as a LWD logging tool in a drilling operation. FIG. 7 is a diagram of an oil drilling system 10 used in the directional drilling of borehole 16. The oil drilling system 10 may be used for drilling on land as well as beneath the water. The borehole 16 is drilled into the earth formation using a rotary drilling rig that includes a derrick 12, drill floor 14, draw works 18, traveling block 20, hook 22, swivel joint 24, kelly joint 26 and rotary table 28. A drill string 100 includes a plurality of drill pipes that are serially connected and secured to the bottom of the kelly joint 26 at the surface. The rotary table 28 is used to rotate the entire drill string 100 while the draw works 18 is used to lower the drill string 100 into the bore hole 16 and apply controlled axial compressive loads. The bottom whole assembly 150 is disposed at the distal end of the drill string 100.

The drilling fluid (also referred to as mud) is usually stored in mud pits or mud tanks 46, and is transferred using a mud pump 38, which forces the drilling fluid to flow through a surge suppressor 40, then through a kelly hose 42, and through the swivel joint 24 and into the top of the drill string 100. The drilling fluid flows through the drill string 100 at about 150 gallons per minute to about 600 gallons per minute and flows into the bottom whole assembly 150. The drilling fluid then returns to the surface by traveling through the annular space between the outer surface of the drill string 100 and the bore hole 16. When the drilling fluid reaches the surface, it is diverted through a mud return line 44 back to the mud tanks 46.

The pressure required to keep the drilling fluid in circulation is measured by a pressure sensitive transducer 48 on the kelly hose 42. The pressure sensitive transducer detects changes in pressure caused by the pressure pulses generated by a pulser. The magnitude of the pressure wave from the pulser may be up to 500 psi or more. The measured pressure is transmitted as electrical signals through transducer cable 50 to a surface computer 52, which decodes and displays the transmitted information. Alternatively, the measured pressure is transmitted as electrical signals through transducer cable 50 to a decoder that decodes the electrical signals and transmits the decoded signals to a surface computer 52, which displays the data on a display screen.

As indicated above, the lower part ("distal part") of the drill string 100 includes the bottom hole assembly (BHA) 150, which includes a non-magnetic drill collar with a MWD system (MWD assembly or MWD tool) 160 installed therein, logging-while drilling (LWD) instruments sub 165 containing LWD instruments, a downhole motor 170, a near-bit measurement sub 175, and the drill bit 180 having drilling nozzles (not shown). The drilling fluid flows through the drill string 100 and is output through the drilling nozzles of the drill bit 180. During the drilling operation, the drilling system 10 may operate in the rotary mode, in which the drill string 100 is rotated from the surface either by the rotary table 28 or a motor in the traveling block 20 (i.e., a top drive). The drilling system 10 may also operate in a sliding mode, in which the drill string 100 is not rotated from the surface but is driven by the downhole motor 170 rotating the drill bit 180. The drilling fluid is pumped from the surface through the drill string 100 to the drill bit 180, being injected into an annulus between the drill string 100 and the wall of the bore hole 16. The drilling fluid carries the cuttings up from the bore hole 16 to the surface.

In one or more embodiments, the MWD system 160 may include a pulser sub, a pulser driver sub, a battery sub, a central storage unit, a master board, a power supply sub, a directional module sub, and other sensor boards. In some embodiments, some of these devices may be located in other areas of the BHA 150. One or more of the pulser sub and pulser driver sub may communicate with the pulser 300, which may be located below the MWD system 160. The MWD system 160 can transmit data to the pulser 300 so that the pulser 300 generates pressure pulses.

The non-magnetic drill collar houses the MWD system 160, which includes a package of instruments for measuring inclination, azimuth, well trajectory (bore hole trajectory), etc. The nuclear logging tool 200 and associated electronic components may be located in LWD instrument sub 165. The nuclear logging tool 200 and other well logging instruments may be electrically or wirelessly coupled together, powered by a battery pack or a power generator driven by the drilling fluid. All information gathered may be transmitted to the surface via in the form of pressure pulses generated by the pulser 300 through the mud column in the drill string.

The near-bit measurement sub 175 may be disposed between the downhole motor 170 and drill bit 180. The nuclear logging tool 200 may alternatively been installed in the near-bit measure sub 175 to provide more accurate real-time formation parameters to guide directional drilling. The data may be transmitted through the cable embedded in the downhole motor 170 to the MWD system 160 in the bottom whole assembly 150.

Figure 8:
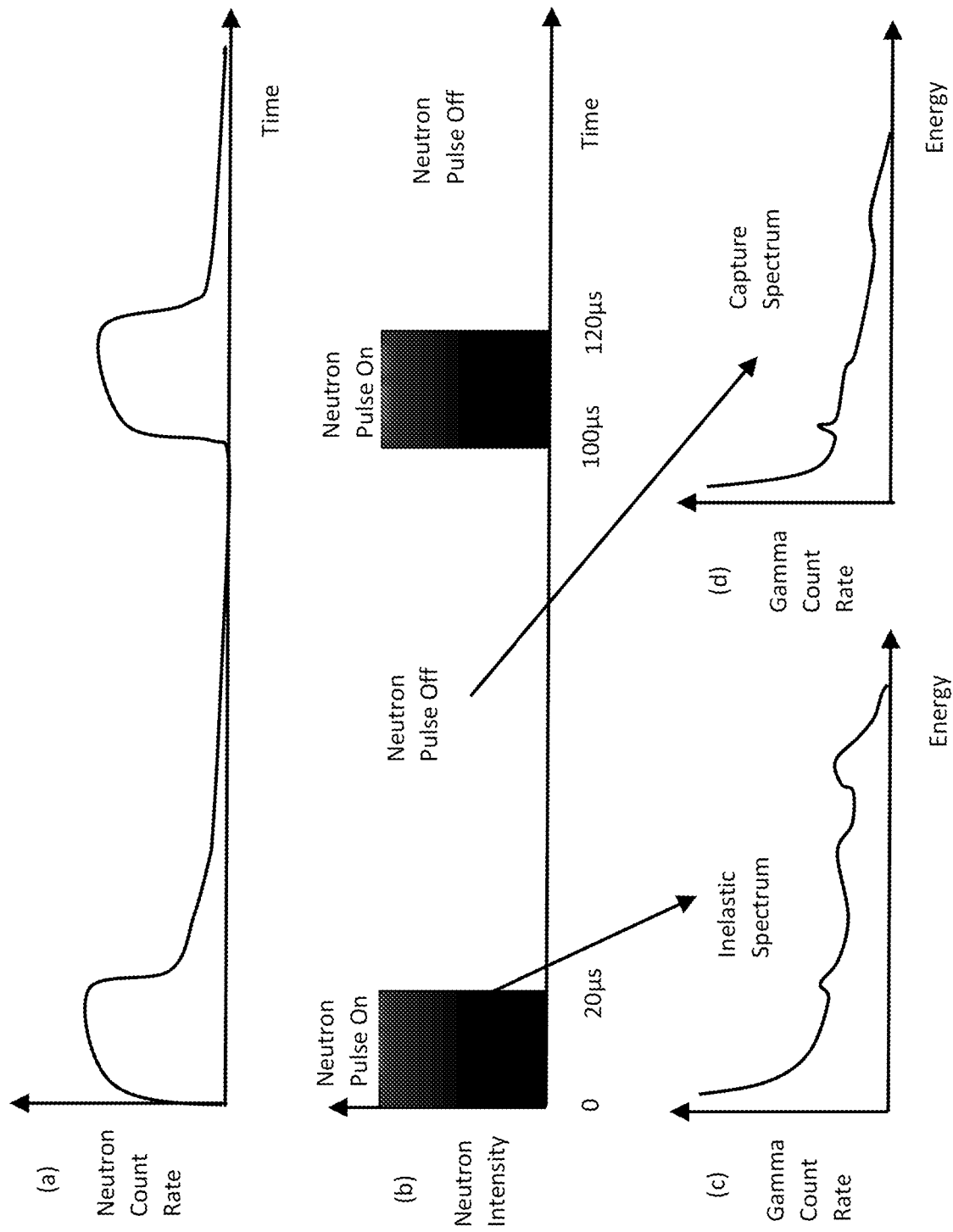
FIG. 8 shows schematics of neutron pulses, neutron count rates, as well as inelastic spectrum and capture spectrum of neutron-induced gamma rays.

In one embodiment of the current disclosure, a variety of formation parameters obtained using a logging tool having a D-T neutron generator and three dual-function detectors. FIG. 8 shows schematics of neutron pulses, neutron count rates, as well as inelastic spectrum and capture spectrum of neutron-induced gamma rays. The frequency of neutron pulses is 10 kHz (the period is 100 µs) and the neutron duty time is 20 µs, as shown in FIG. 8, panel (b).

The neutron count rates measured from each of the three detectors, shown in FIG. 8, panel (a), are utilized to obtain formation porosity. Neutrons from three detectors may be further separated according to whether the neutron pulse is ON or OFF, which serves as a coincident or anti-coincident signal to neutrons from the three detectors so that during the neutron pulses (when neutron pulse is ON), neutrons are recorded mainly as fast neutrons. Between the neutron pulses (when neutron pulse is OFF), neutrons are recorded as thermal neutrons. Fast neutrons and thermal neutrons recorded at three detectors can be used to obtain fast neutron space distribution and thermal neutron space distribution. The neutrons from each detector may also be recorded together. In that case, all neutrons (from thermal neutrons to fast neutrons) are used to obtain the neutron space distribution.

Gamma rays from three detectors may be further separated according to whether the neutron pulse is ON or OFF, which serves as a coincident or anti-coincident signal to gamma rays from the three detectors so that during the neutron pulses (neutron pulse is ON), gamma rays are mainly recorded as inelastic spectrum induced by inelastically scattered fast neutrons, shown in FIG. 8, panel (c). Between the neutron pulses (neutron pulse is OFF), gamma rays are recorded as capture spectrum induced by thermal neutrons, shown in FIG. 8, panel (d). Proper time windows are selected so that gamma rays measured in the capture time window are from thermal neutron capture reactions and most gamma rays measured in the inelastic time window are from fast neutron inelastic scattering.

Background noises in various detectors may be measured while the neuron generator is OFF for a period of time and can be subtracted from the total signals of either neutrons or gamma rays. Neutron background measured during the neutron pulses may be further subtracted to get "pure" fast neutrons by using a small percentage of the measured neutrons between the neutron pulses. Similarly, the capture gamma rays measured during the neutron pulses may be further subtracted to get "pure" inelastic spectrum by using a small percentage of the measured capture spectrum between neutron pulses.

Gamma rays detected by each detector can also be recorded in one energy spectrum (e.g., a total energy spectrum), whether they are initiated from neutron inelastic scattering or neutron capture reactions. In this way, several formation measurements are feasible, such as the formation porosity, elemental concentrations, and formation oil/gas saturation, but one may not be able to get formation density, as the spectrum of inelastic gamma rays are needed to obtain the formation density for a D-T pulsed neutron generator-based measurement system.

Figure 9:
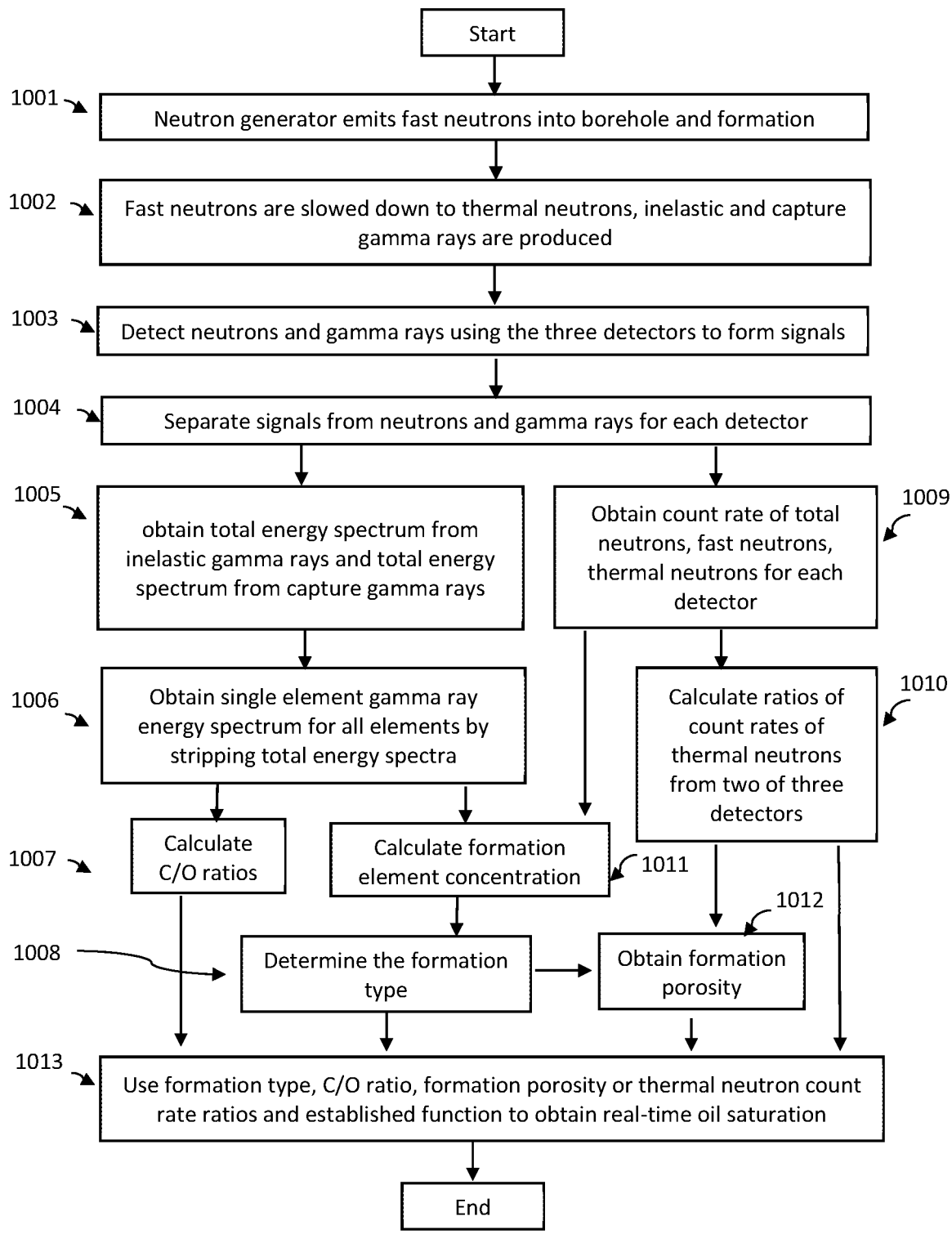
FIG. 9 is a flow diagram showing exemplary methods to obtain oil saturation in the formation according to the current disclosure.

FIG. 9 is an exemplary workflow showing the steps in the processing of data from the logging tool 200 having one D-T neutron generator and three detectors (the near detector, the middle detector, and the far detector) to obtain real-time oil saturation in the formation. In Step 1001, the D-T neutron generator emits neutron pulses into the formation surrounding the measurement tool. In Step 1002, fast neutrons are slowed down to become thermal neutrons. Inelastic gamma rays and capture gamma rays are produced.

In Step 1003, neutrons and neutron-induced gamma rays are detected by the three detectors. In Step 1004, signals from neutrons and neutron-induced gamma rays are distinguished from each other, e.g., using the pulse shape discrimination (PSD) technique. In Step 1009, the neutron signals from the three detectors are then utilized to obtain the total count rates ($CRN_n$, $CRN_m$, $CRN_f$), fast neutron count rates ($CRFN_n$, $CRFN_m$, $CRFN_f$), thermal neutron count rates ($CRTN_n$, $CRTN_m$, $CRTN_f$), which are further utilized to obtain the neutron porosity by using the ratios of total neutrons ($Rn_{m/f}$, $Rn_{n/f}$, $Rn_{n/m}$), or the ratios of thermal neutrons ($Rtn_{f/m}$, $Rtn_{f/n}$, $Rtn_{m/n}$) in Step 1010.

On the other hand, in Step 1005, the total energy spectrum from inelastic gamma rays and the total energy spectrum from capture gamma rays are defined after the separation in Step 1004. In Step 1006, the total energy spectrum from Step 1005 can be stripped using standard energy spectrum for single elements, e.g., C, O, Fe, etc. Accordingly, the C/O ratio can be obtained in Step 1007.

In addition, in Step 1011, the fast neutron count rates and the thermal neutron count rates at the three detectors from Step 1010 and the inelastic spectrum and the capture spectrum obtained in Step 1006 are used in calculating formation element concentrations. Once formation element concentrations are known, the formation type can be determined, i.e., in Step 1008. Equipped with formation type from Step 1008 and count ratios from Step 1010, one may obtain formation porosity in Step 1012.

Finally, In Step 1013, the formation oil saturation can be determined using information on formation type, C/O ratio, formation porosity or thermal neutron count rate ratios as shown in more details in FIG. 10 and description below. Note that most of the neutrons detected by the detectors are thermal neutrons while some epithermal neutrons are also detected.

Figure 10:
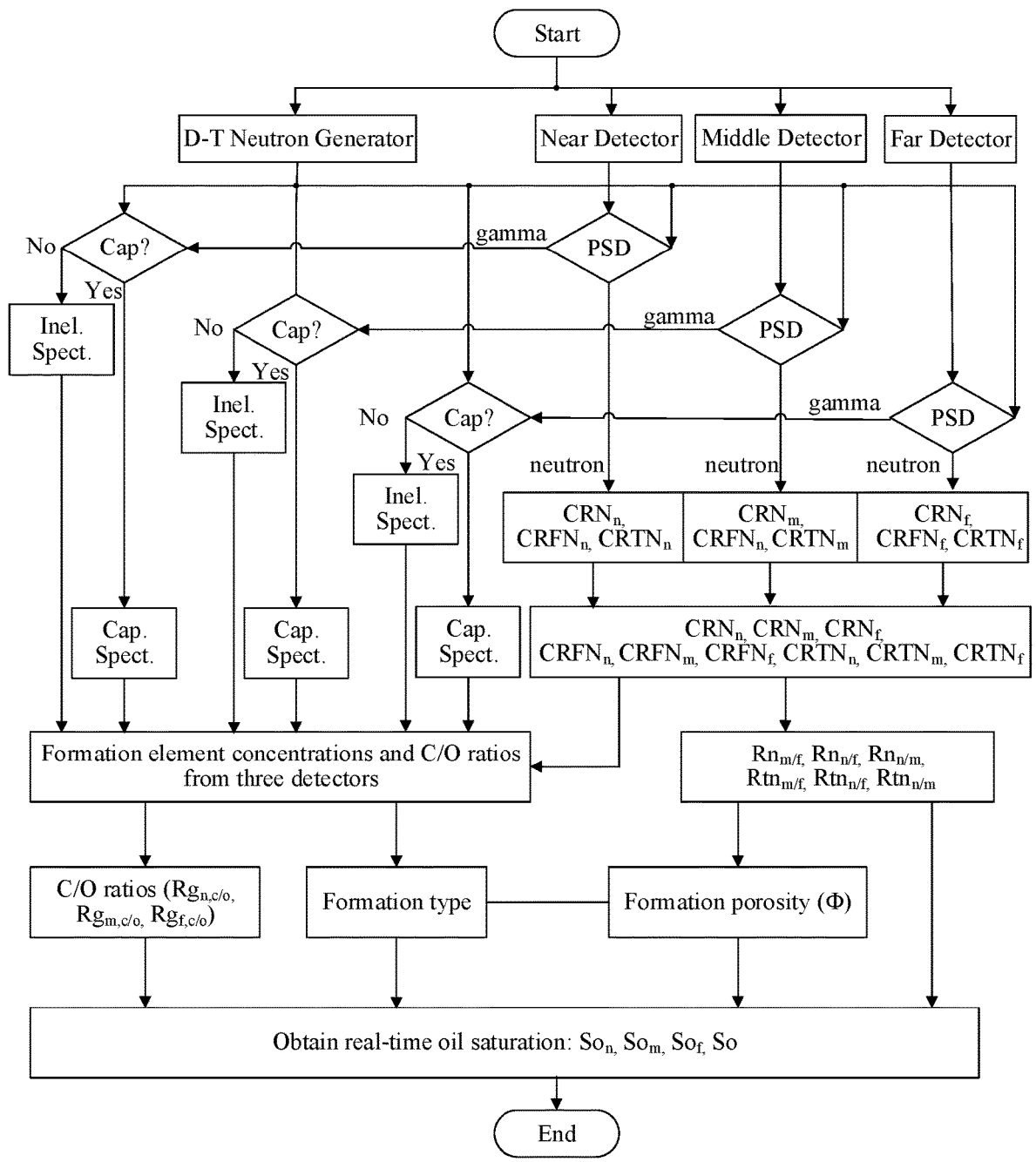
FIG. 10 is another flow diagram showing exemplary methods to obtain oil saturation in the formation according to the current disclosure.

FIG. 10 presents another embodiment of this disclosure using mathematical symbols and equations, carried out using an exemplary logging tool 200 (e.g., FIGS. 2A to 2D). The count rates of neutrons (CRN) measured during and between neutron pulses from the near detector, the middle detector, and the far detector ($CRN_n$, $CRN_m$, $CRN_f$) are utilized to obtain the formation porosity ($\phi$) by using the ratios of the count rates.

The middle-to-far ratio ($Rn_{m/f}$), the near-to-far ratio ($Rn_{n/f}$) and the near-to-middle ratio ($Rn_{n/m}$) can be obtained by using Equations 1, 2, and 3, respectively. Since the three detectors are placed at different distances from the neutron source, they have different depth of investigations. As a result, near-wellbore environments, such as borehole fluid, cement, etc., have different impacts on the three ratios. The $Rn_{m/f}$ is more sensitive to the formation, $Rn_{n/m}$ is more sensitive to the near-wellbore changes and $Rn_{n/f}$ is sensitive to both.

$$Rn_{m/f} = \frac{CRN_m}{CRN_f}, \qquad (1)$$

$$Rn_{n/f} = \frac{CRN_n}{CRN_f}, \qquad (2)$$

$$Rn_{n/m} = \frac{CRN_n}{CRN_m}. \qquad (3)$$

The formation porosity $\phi_n$ can be obtained by first using $Rn_{n/m}$ and/or $Rn_{n/f}$ to correct $Rn_{m/f}$ and then use the corrected far-to-middle ratio $Rnc_{m/f}$ to obtain the formation porosity for a specific formation, e.g., sandstone, limestone, or dolomite. Equations (4)-(6) illustrate this algorithm, $\Delta R$ being the correction value.

$$Rnc_{m/f} = Rn_{m/f} + \Delta R, \qquad (4)$$

$$\Delta R = f_1(Rn_{m/f}, Rn_{n/f}, Rn_{n/m}), \qquad (5)$$

$$\phi_n = f_2(Rnc_{m/f}). \qquad (6)$$

Alternatively, the formation porosity $\phi_n$ may also be obtained using the three ratios of capture gamma rays count rates obtained by the three detectors, according to an algorithm similar to that described in Equations 1-6.

The formation porosity $\phi_n$ may also be obtained by combining the two porosities obtained based on neutrons and capture gamma rays. In still other methods, the formation porosity $\phi_n$ can be obtained directly from the three ratios of neutrons and three ratios of capture gamma rays using other methodologies.

Formation type can be obtained by measuring the energy spectrum of gamma rays from both neutron inelastic scattering and neutron capture reactions, using the same tool.

Neutron pulses from the D-T neutron generator are timed as descried in relation to FIG. 8. In turn, neutron-induced gamma ray signals from the three detectors, after being separated from neutron signals, are further separated into gamma ray signals from thermal neutron capture reactions and gamma ray signals from fast neutron inelastic scattering. Both of them are used to conduct elemental analysis of the formation, e.g., hydrogen (H), silicon (Si), calcium (Ca), iron (Fe), sulfur (S), and chlorine (Cl).

In some embodiments, gamma rays detected by each detector may be recorded either in two separate spectra (inelastic spectrum and capture spectrum) or in one spectrum (a total spectrum). In either case, the elements can be identified, relative yields of characteristic gamma rays from those elements can be obtained, so as the element concentrations.

Since the three detectors in the logging tool 200 detect both neutrons and gamma rays simultaneously at three different locations, one may obtain a more precise neutron space distributions (both fast neutron space distribution and thermal neutron space distribution) using the neutron count rates from three detectors. The measured neutron space distributions can then be utilized to get a more accurate calculation of the concentrations of elements such as C, O, H, Cl, Si, etc.

The inelastic spectrum from the three detectors is fitted with standard gamma ray spectra of various elements in the formation, including carbon and oxygen, which allows separating of gamma ray signals from oxygen and of gamma ray signals from carbon from the inelastic spectrum. As such, the ratio of count rates of inelastic gamma rays from carbon and oxygen (C/O ratios) can be obtained either using the ratio of the total inelastic gamma ray count rates from C to the total inelastic gamma ray count rates from O. The C/O ratios can also be obtained using the ratio of the inelastic gamma ray count rates under the peaks of C or O in the selected energy windows. On the other hand, the formation element concentrations are utilized to determine formation types. The formation type is also utilized to obtain formation porosity. Knowing the C/O ratios, the formation type and porosity, oil saturation can be estimated for a specific wellbore environment (e.g., borehole size, borehole fluid etc.).

An exemplary algorithm calculates the apparent oil saturations for a known wellbore environment (borehole size, wellbore fluid, casing, etc.) from the near, middle, and far detectors ($So_n$, $So_m$, $So_f$) is shown by using Equations 16 through 18, respectively. After the three apparent oil saturations are obtained, the corrected oil saturations—So—can be calculated, e.g., by a weight averaged apparent oil saturation or a polynormal function of $So_n$, $So_m$, $So_f$ with different coefficients. The calculation of $So_n$, $So_m$, $So_f$, and So can be represented by Equation 19, as shown in the following:

$$So_n = f_1(Rg_{n,c/o}, \phi, \text{formation type}), \quad (16)$$

$$So_m = f_2(Rg_{m,c/o}, \phi, \text{formation type}), \quad (17)$$

$$So_f = f_3(Rg_{f,c/o}, \phi, \text{formation type}), \quad (18)$$

$$So = f_4(So_n, So_m, So_f). \quad (19)$$

$Rg_{n,c/o}$, $Rg_{m,c/o}$, and $Rg_{f,c/o}$ are the C/O ratios based on inelastic gamma ray count rates from carbon and oxygen detected at the near, middle, and far detectors, respectively. The corrected oil saturation may also be obtained by using the C/O ratios ($Rg_{n,c/o}$, $Rg_{m,c/o}$, $Rg_{f,c/o}$), formation type, formation porosity ($\phi$) and fast neutron ratios ($Rfn_{f/m}$, $Rfn_{f/n}$, $Rfn_{m/n}$) from the three directors, shown in Equation 20:

$$So = f_5(Rg_{n,c/o}, Rg_{m,c/o}, Rg_{f,c/o}, \phi, \text{formation type}, Rfn_{m/f} \; Rfn_{n/f}, Rfn_{n/m}). \quad (20)$$

In a further embodiment, the corrected oil saturation may also be obtained by using the C/O ratios ($Rg_{n,c/o}$, $Rg_{m,c/o}$, $Rg_{f,c/o}$), formation type and one of thermal neutron ratios ($Rtn_{f/m}$, $Rtn_{f/n}$, $Rtn_{m/n}$) from two of the three directors, e.g., near detector and far detector, shown in Equation 21:

$$So = f_6(Rg_{n,c/o}, Rg_{m,c/o}, Rg_{f,c/o}, \text{formation type}, Rtn_{n/f}). \quad (21)$$

In yet another further embodiment, the corrected oil saturation may also be obtained by using the C/O ratios ($Rg_{n,c/o}$, $Rg_{m,c/o}$, $Rg_{f,c/o}$), formation type, one of thermal neutron ratios ($Rtn_{f/m}$, $Rtn_{f/n}$, $Rtn_{m/n}$) from two of the three directors, e.g., near detector and far detector, and fast neutron ratios ($Rfn_{f/m}$, $Rfn_{f/n}$, $Rfn_{m/n}$) from the three directors shown in Equation 22:

$$So = f_7(Rg_{n,c/o}, Rg_{m,c/o}, Rg_{f,c/o}, \text{formation type}, Rtn_{n/f} \; Rfn_{n/f}, Rfn_{n/f}, Rfn_{n/m}) \quad (22)$$

Note that Equations 20-22 represents a suitable algorithm with variables in the parenthesis. The algorithm can be a polynormal function of $So_n$, $So_m$, $So_f$ with theoretical or empirical coefficients.

Alternatively, instead of inelastic spectrum, a total energy spectrum from both inelastic gamma rays and capture gamma rays can also be used to obtain the C/O ratios. In this case, the standard total gamma ray spectrum (includes inelastic gamma rays and capture gamma rays) from each element in the formation are used to fit the total energy spectrum to isolate gamma rays from carbon and oxygen. The fitting is more complex and the results may be less accurate than fitting inelastic spectrum only. Likewise, the C/O ratios can also be obtained using the ratio of the total gamma ray count rates under the peaks of C or O in the selected energy windows. However, the approach allows operating D-T neutron generator in a continuous mode or using an isotope neutron source, such as Am—Be, Pu—Be, Cf-252, etc., can be used as the neutron source.

While in the foregoing specification this disclosure has been described in relation to certain preferred embodiments thereof, and many details have been set forth for purpose of illustration, it will be apparent to those skilled in the art that the disclosure is susceptible to alteration and that certain other details described herein can vary considerably without departing from the basic principles of the disclosure. In addition, it should be appreciated that structural features or methodologies shown or described in any one embodiment herein can be used in other embodiments as well.

What is claimed is:

1. A method for measuring a parameter of a subterranean formation, comprising:
    S1: deploying a nuclear logging tool into the subterranean formation, wherein the nuclear logging tool comprises one or more neutron source and three or more detectors configured to simultaneously detect neutrons and gamma rays;
    S2: causing the one or more neutron sources to emit neutrons into the subterranean formation;

S3: receiving neutrons and gamma rays from the subterranean formation at the three or more detectors to generate electric signals;

S4: separating electric signals from neutrons and from gamma rays for each of the three or more detectors;

S5: obtaining an inelastic energy spectrum form inelastic gamma rays and a capture energy spectrum from capture gamma rays;

S6: obtaining single element gamma ray energy spectrum for each of a plurality of elements;

S7: calculating an elemental yield of each element to obtain a concentration of each element in the formation;

S8: determining the formation type based on the element concentrations in the formation;

S9: obtaining count rates for total neutrons, fast neutrons, thermal neutrons for each of the three or more detectors;

S10: calculating a ratio of neutron count rates for every two detectors amongst the three or more detectors to obtain a plurality of neutron count rate ratios; and S11: obtaining a formation porosity based on the plurality of neutron count rate ratios and the formation type.

2. The method of claim 1, wherein the plurality of elements are selected from Mg, Fe, S, C, Al, Si, Ca, O, Ti, K, Gd, Cl, and H.

3. The method of claim 1, wherein fast neutron count rates and thermal neutron count rates at the three or more detectors and the inelastic energy spectrum and the capture energy spectrum obtained are used in calculating element concentrations.

4. The method according to claim 1, wherein a first ratio, a second ratio, and a third ratio of count rates are obtained in S11, and S12 further comprising:

correcting a first neutron count ratio for near wellbore effect using a second neutron count ratio and a third neutron count ratio;

obtaining a correlation between neutron count ratio and formation porosity for the formation type; and inputting the corrected first neutron count ratio into the correlation to obtain the porosity for the formation.

5. A method for measuring oil saturation of a subterranean formation, comprising:

obtaining the formation type and the formation porosity according to claim 1; and calculating oil saturation using the formation type, the formation porosity, and a parameter selected from C/O ratios at each of the three or more detectors, a total neutron count rate at each of the three or more detectors, a fast neutron count rate at each of the three or more detectors, and a thermal neutron count rate at each of the three or more detectors.

6. The method according to claim 5, wherein the calculating step further comprises:

calculating a plurality of apparent oil saturation values using the formation type, the formation porosity, and each of the C/O ratio at each of the three or more detectors; and calculating a corrected oil saturation using the plurality of apparent oil saturation values.

7. The method according to claim 6, wherein the nuclear logging tool has a near detector, a middle detector, and a far detector, and three apparent oil saturation values are calculated for the near detector, the middle detector, and the far detector, respectively.

8. The method according to claim 7, further comprising calculating a correct oil saturation value using the three apparent saturation values.

9. The method according to claim 5, wherein the oil saturation value is calculated using the formation type, the formation porosity, at least one C/O ratio at one of the one or more detectors, and at least one fast neutron count ratio at one of the one or more detectors.

10. The method according to claim 9, wherein the nuclear logging tool has a near detector, a middle detector, and a far detector, and the oil saturation value is calculated using the formation type, the formation porosity, the C/O ratio and the fast neutron count ratio at the near detector, the C/O ratio and the fast neutron count ratio at the middle detector, and the C/O ratio and the fast neutron count ratio and the far detector.

11. The method according to claim 5, wherein the oil saturation value is calculated using the formation type, at least one C/O ratio at one of the one or more detectors, and one thermal neutron count ratio at one of the one or more detectors.

12. The method according to claim 11, wherein the nuclear logging tool has a near detector, a middle detector, and a far detector, and the oil saturation value is calculated using formation type, the C/O ratio at the near detector, the C/O ratio at the middle detector, and the C/O ratio at the far detector, and one thermal neutron count ratio between two of the near detector, the middle detector, and the far detector.

13. The method according to claim 5, wherein the oil saturation value is calculated using the formation type, at least one C/O ratio at one of the one or more detectors, one thermal neutron count ratio at one of the one or more detectors, and at least one fast neutron count ratio at one of the one or more detectors.

14. The method according to claim 13, wherein the nuclear logging tool has a near detector, a middle detector, and a far detector, and the oil saturation value is calculated using formation type, the C/O ratio at the near detector, the C/O ratio at the middle detector, and the C/O ratio at the far detector, and one thermal neutron count ratio between two of the near detector, the middle detector, and the far detector.

* * * * *